(12) United States Patent
Boyd et al.

(10) Patent No.: US 11,899,775 B2
(45) Date of Patent: *Feb. 13, 2024

(54) DEVICE MANAGER PROVIDING RESOURCE CONTROL AND SYNCHRONIZATION

(71) Applicant: Apple Inc., Cupertino, CA (US)

(72) Inventors: Andrew C. Boyd, San Carlos, CA (US); Denis J. Palmans, Saratoga, CA (US); Peter H. van der Veen, Ottawa (CA); Stephen J. McPolin, Ottawa (CA); Gilberto Gemin, Kanata (CA); Stephane Couture, Ottawa (CA); Joseph A. Sarlo, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 17/190,699

(22) Filed: Mar. 3, 2021

(65) Prior Publication Data
US 2021/0182375 A1 Jun. 17, 2021

Related U.S. Application Data

(63) Continuation of application No. 16/117,679, filed on Aug. 30, 2018, now Pat. No. 10,970,383.
(Continued)

(51) Int. Cl.
*G06F 21/00* (2013.01)
*G06F 21/44* (2013.01)
*G06F 9/44* (2018.01)

(52) U.S. Cl.
CPC ............ *G06F 21/44* (2013.01); *G06F 9/44* (2013.01)

(58) Field of Classification Search
CPC .................................. G06F 21/44; G06F 9/44
See application file for complete search history.

(56) References Cited

U.S. PATENT DOCUMENTS

| 7,404,203 B2 | 7/2008 | Ng |
| 7,490,333 B2 | 2/2009 | Grimaud et al. |

(Continued)

OTHER PUBLICATIONS

The Spring Nucleus: A Microkernel for Objects, Graham Hamilton and Panos Kougiouris, Sun Microsystems Laboratories, Inc. ,Mountain View, CA 94043 Usasmli TR-93-14, Apr. 1993, 15 pages.

(Continued)

*Primary Examiner* — Ghazal B Shehni
(74) *Attorney, Agent, or Firm* — Kowert, Hood, Munyon, Rankin & Goetzel, P.C.

(57) ABSTRACT

In an embodiment, an operating system includes a device manager that is a central repository of device information. Device drivers may communicate with the device manager over respective channels, and may request channel identifiers (Cids) to communicate with resources related to the respective devices. The device manager may provide values for resource access (or handles that the resources may use to access values). In an embodiment, the device drivers do not have the ability to allocate resources for a peripheral device. Accordingly, the security of the system may be increased. Furthermore, the resource allocation may be centrally located, simplifying the process of updating resource allocation when needed. Additionally, the device manager may delay response to requests from a given device driver until its dependencies are clear (e.g., other device drivers and hardware initializations). Thus, startup scripts may be avoided in some embodiments.

20 Claims, 12 Drawing Sheets

Related U.S. Application Data

(60) Provisional application No. 62/565,905, filed on Sep. 29, 2017.

(56) References Cited

U.S. PATENT DOCUMENTS

| | | | |
|---|---|---|---|
| 7,966,622 B1* | 6/2011 | Purser | G06F 8/65 |
| | | | 710/63 |
| 9,852,149 B1* | 12/2017 | Taylor | G06F 16/1844 |
| 10,970,383 B2 | 4/2021 | Boyd et al. | |
| 2004/0243845 A1* | 12/2004 | Larsen | G06F 21/44 |
| | | | 726/4 |
| 2010/0205667 A1* | 8/2010 | Anderson | G06F 3/017 |
| | | | 726/19 |
| 2013/0103380 A1 | 4/2013 | Brandstaetter et al. | |
| 2013/0198538 A1* | 8/2013 | Diab | G06F 1/3278 |
| | | | 713/310 |
| 2017/0364701 A1* | 12/2017 | Struttmann | G06F 21/78 |
| 2018/0034828 A1* | 2/2018 | Koenig | H04L 63/1425 |
| 2019/0010253 A1 | 4/2019 | Boyd et al. | |

OTHER PUBLICATIONS

QNX Neutrino RTOS System Architecture, QNX Software Systems Limited, 324 pages, Feb. 20, 2014.

Mach: A New Kernel Foundation For UNIX Development Mike Accetta, Robert Baron, William Bolosky, David Golub, Richard Rashid, Avadis Tevanian and Michael Young Computer Science Department Carnegie Mellon University Pittsburgh, Pa. 15213, Apr. 1986, 15 pages.

ChorusOS 5.0 Features and Architecture Overview, Chapter 2 Architecture and Benefits of the Chorus OS Operating System Oracle Corporation, 2010, 17 pages.

ISR/WO PCT/US2018/0481852, dated Dec. 21, 2018, 11 pages.

IPRP, PCT/US2018/048182, dated Apr. 9, 2020, 8 pages.

* cited by examiner

DEVICE MANAGER PROVIDING RESOURCE CONTROL AND SYNCHRONIZATION

This application is a continuation of U.S. patent application Ser. No. 16/117,679, filed on Aug. 30, 2018 and now U.S. Pat. No. 10,970,383, which claims benefit of priority to U.S. Provisional Patent Application Ser. No. 62/565,905, filed on Sep. 29, 2017. The above applications are incorporated herein by reference in their entireties. If any material in the provisional application conflicts with material expressly set forth herein, the expressly set forth material controls.

BACKGROUND

Technical Field

This disclosure relates generally to electronic systems and, more particularly, to operating systems on such electronic systems.

Description of the Related Art

Most electronic systems (e.g., computing systems, whether stand alone or embedded in other devices) have a program which controls access by various other code executing in the system to various hardware resources such as processors, peripheral devices, memory, etc. The program also schedules the code for execution as needed. This program is typically referred to as an operating system.

The electronic systems generally include a variety of devices. The operating system controls which other programs have access to the devices, initializes the devices for operation, and manages the access to the devices by the permitted programs. One or more device drivers are typically included in the operating system, or are closely coupled to the operating system. The device drivers are invoked by the operating system to communicate with the device on behalf of the operating system or a permitted program. Generally, the device driver is responsible for the low-level control of the device and providing a higher-level interface for the other program, ensuring that sequencing of requests from different programs, etc.

The device drivers often have significant control in the system. For example, the device drivers often directly determine the address spaces used by the device, allocate interrupts for the device, etc. It is difficult to ensure a secure system in the presence of such device drivers. Additionally, if the addresses or other resources used by the device are changed, the locations in which the data is stored may be difficult to determine and correctly update. Each device driver may store such information differently and in different locations. If resources such as address spaces need to be reallocated, it can be challenging to find all the locations to be changed.

Additionally, the device drivers are often initiated as separate threads, without any particular synchronization between them. To manage initialization of the system, typically a number of "startup scripts" are manually created and tuned to successfully initialize the system in the correct order. Such scripts are difficult to maintain and modify.

SUMMARY

In an embodiment, an operating system includes a device manager that is a central repository of device information. Device drivers may communicate with the device manager over respective channels, and may request channel identifiers (Cids) to communicate with resources related to the respective devices. The device manager may provide values for resource access (or handles that the resources may use to access values). In an embodiment, the device drivers do not have the ability to allocate resources for a peripheral device. Accordingly, the security of the system may be increased. Furthermore, the resource allocation may be centrally located, simplifying the process of updating resource allocation when needed. Additionally, the device manager may delay response to requests from a given device driver until its dependencies are clear (e.g., other device drivers and hardware initializations). Thus, startup scripts may be avoided in some embodiments.

Viewed in another way, the operating system may provide restricted, vendable, and transferable hardware resources. The hardware resources may be restricted because their allocation is made by the device manager, and thus other entities (e.g., non-trusted entities) may not allocate the resources. The device manager also controls which entities have access to the resources, and how much access. For example, if an entity requests a hardware resource, the device manager may deny the request, or may provide an opaque handle to the request so that the entity may not determine the resource value but may provide the handle to another entity to access the resource on its behalf, or may provide the resource value itself. An entity may vend the handle to another entity, or transfer the resource value to another entity, as desired.

BRIEF DESCRIPTION OF THE DRAWINGS

The following detailed description makes reference to the accompanying drawings, which are now briefly described.

Figure 1:
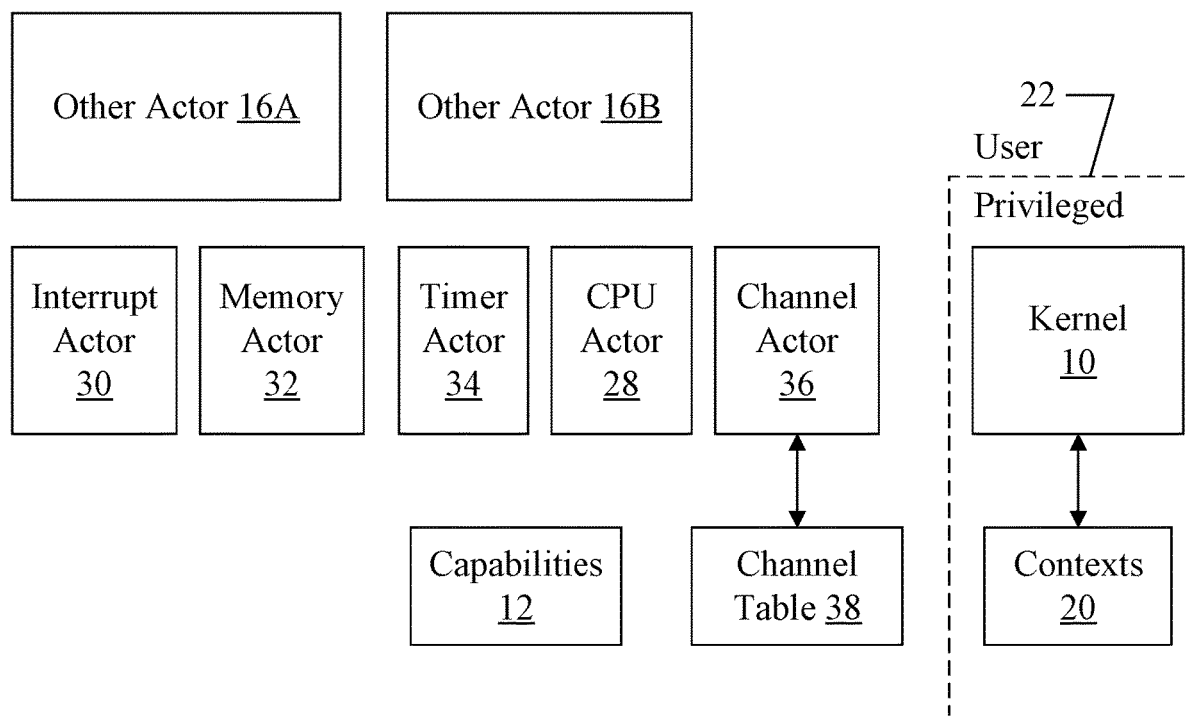
FIG. 1 is a block diagram of one embodiment of an operating system in accordance with this disclosure.

While this disclosure may be susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure. Generally, this disclosure is not intended to refer to one particular implementation, but rather a range of embodiments that fall within the spirit of the present disclosure, including the appended claims.

DETAILED DESCRIPTION OF EMBODIMENTS

Turning now to FIG. 1, a block diagram of one embodiment of an operating system and related data structures is shown. In the illustrated embodiment, the operating system includes a kernel 10, a set of capabilities 12, a set of base actors, and a set of other actors 16A-16B. The base actors, in this embodiment, may include a central processing unit (CPU) actor 28, an interrupt actor 30, a memory actor 32, a timer actor 34, and a channel actor 36. Other embodiments may include other base actors, including subsets or supersets of the illustrated base actors and/or other actors. The kernel 10 may maintain one or more contexts 20. The channel actor 36 may maintain a channel table 38. There may be any number of base actors and other actors in a given embodiment.

Each capability 12 includes a function in an address space that is assigned to the capability 12. The data structure for the capability 12 may include, e.g., a pointer to the function in memory in a computer system. In an embodiment, a given capability 12 may include more than one function. In an embodiment, the capability 12 may also include a message mask defining which messages are permissible to send to the capability 12. A given actor which employs the capability 12 may further restrict the permissible messages, but may not override the messages which are not permissible in the capability 12 definition. That is, the capability 12 definition may define the maximum set of permissible messages, from which a given actor may remove additional messages. While message masks are used in some embodiments, any mechanism for identifying valid messages for the capability and further restricting messages in a given actor may be used. The union of the permitted messages may be the permitted messages in the given actor.

Each base actor 28, 30, 32, 34, and 36 may employ one or more capabilities 12. A given actor may employ any number of capabilities, and a given capability may be employed by any number of actors. Because actors 28, 30, 32, 34, and 36 directly employ capabilities 12 and do not include other actors, the actors 30, 32, 34, and 36 may be referred to as base actors. The base actors may provide the low level functions of the operating system. Other actors 16A-16B may interact with the base actors, which each other, and/or may include additional capabilities to build more complex functionality. In an embodiment, the operating system disclosed herein may be viewed as a lightweight capability system, as the structure to access the capability may simply be one or more pointers to the capability function. This differs from the use of keys and tree spanning access methods that some capability-based systems use.

Accordingly, an actor may generally be defined as a container for one or more capabilities, either directly employed or employed via the inclusion of another actor. A container may be any type of data structure, class, data type, etc. that can store data allowing the capabilities to be accessed/executed. For example, a data structure with pointers to capabilities (or to other actors which point to the capabilities in a pointer chain) may be one form of container. More generally, a container may be any structure that organizes a group of objects in a defined way that follows specific access rules. In an embodiment, actors may be compiled into the operating system and may be optimized to limit the number of exceptions that may occur (e.g., by merging code into the actor, allowing some or all of the actor to execute in privileged space, etc.). When the code is merged together, the exception in the code one actor that would have led to execution of code in another actor may be eliminated since the code has been merged. However, the model that the operating system is designed to may be that the actor is a container and may be proven to be safe and stable. Then, the compiled version may be shown to be equivalent to the model and thus also safe and stable. Safety and stability may be critical in certain products in which the operating system may be employed. For example, the operating system may be in a computing system that is embedded in the product. In one particular case, the product may be a vehicle and the embedded computing system may provide one or more automated navigation features. In an embodiment, any type of vehicle may be used, such as an aircraft, boat, automobile, recreational vehicle, etc. In some embodiments, the automated navigation features may automate any portion of driving, up to and including fully automated navigation in at least one embodiment, in which the human operator is eliminated. Safety and stability may be key features of such an operating system. Additionally, security of the operating system may be key in such cases, as an attack which disables or destabilizes the system may disable the vehicle or possibly even cause a crash. In a traditional monolithic kernel operating system, the one operating system entity (the kernel) is responsible for all functions (memory, scheduling, I/O, time, thread management, interrupts, etc.). Any compromise in any of the functions could compromise the whole system. In the present operating system, however, the entities are separated and communicate via channels that do not permit compromise. Each entity may be provided with as much privileged and as needed to complete its operation. Thus, a compromise of one entity may not compromise the system and the leakage of privileged that often occurs in the monolithic kernel is not possible.

In an embodiment, the operating system may be a real time operating system that is designed to complete tasks within specified time intervals, so that the system may respond quickly enough to manage events that are occurring in "real time" (e.g., without undue buffering or other delays). For example, in the automated navigation functions mentioned above, the system may be able to react quickly enough to inputs in order to effectuate corresponding automated navigation outputs to keep the vehicle operating in a safe manner.

The dotted line 22 divides the portion of the operating system that operates in user mode (or space) and the portion that operates in privileged mode/space. As can be seen in FIG. 1, the kernel 10 is the only portion of the operating system that executes in the privileged mode in this embodiment. The remainder of the operating system executes in the user mode. Privileged mode may refer to a processor mode (in the processor executing the corresponding code) in which access to protected resources is permissible (e.g., control registers of the processor that control various processor features, certain instructions which access the protected resources may be executed without causing an exception, etc.). In the user mode, the processor restricts access to the protected resources and attempts by the code being executed to change the protected resources may result in an exception. Read access to the protected resources may not be permitted as well, in some cases, and attempts by the code to read such resources may similarly result in an exception. Because most of the operating system executes in the user space, the user mode protections may apply. Thus, "privilege leak," where privileged code that is expected to access only certain protected resources but actually accesses others through error or nefarious intent, may be much less likely in the disclosed embodiments. Viewed in another way, each entity in the system may be given the least amount of privileged possible for the entity to complete its intended operation.

Moreover, the kernel 10 may be responsible for creating/maintaining contexts 20 for actors and assigning actors to execute on various processors in the computer system, but may include no other functionality in this embodiment. Thus, in an embodiment, the kernel 10 may be viewed as a form of microkernel. The contexts 20 may be the data which the processor uses to resume executing a given code sequence. It may include settings for certain privileged registers, a copy of the user registers, etc., depending on the instruction set architecture implemented by the processor. Thus, each actor may have a context (or may have one created for it by the kernel 10, if it is not active at the time that another actor attempts to communicate with it).

The CPU actor 28 may represent the processors in the system that act as the CPUs. Generally, the CPUs may be the "main processors" in a system and may execute the components of the operating system, such as the various base actors and composed actors shown in FIG. 1. The CPUs may also execute other code sequences such as threads of application programs. The CPU actor 28 may be a mechanism for other actors to access processor state, for example.

The interrupt actor 30 may be responsible for handling interrupts in the system (e.g., interrupts asserted by devices in the system to the processor, or processor's assertions to other processors). In an embodiment, the interrupt actor 30 may be activated by the kernel 10 in response to interrupts (as opposed to exceptions that occur within a processor in response to internal processor operation/instruction execution). The interrupt actor 30 may gather information about the interrupt (e.g., from an interrupt controller in the computing system on which the operating system executes, interrupt controller not shown) and determine which actor in the system should be activated to respond to the interrupt (the "targeted actor" for that interrupt). The interrupt actor 30 may generate a message to the targeted actor to deliver the interrupt.

The memory actor 32 may be responsible for managing memory, providing access to memory when requested by other actors and ensuring that a given memory location is only assigned to one actor at a time. The memory actor 32 may operate on physical memory. Other actors may be implemented to, e.g., provide a virtual memory system. Such actors may use the memory actor 32 to acquire memory as needed by the virtual memory system. That is, such actors may be composed actors that incorporate the memory actor 32 and other functions (e.g., capabilities, or capabilities in other actors).

The timer actor 34 may be responsible for implementing a timer in the system. The timer actor 34 may support messages to read the timer, set an alarm, etc.

The channel actor 36 may be responsible for creating and maintaining channels between actors. Channels may be the communication mechanism between actors for control messages. Data related to the control messages may be passed between actors in any desired fashion. For example, shared memory areas, ring buffers, etc. may be used.

In an embodiment, an actor may create a channel on which other actors may send the actor messages. The channel actor 36 may create the channel, and may provide an identifier (a channel identifier, or Cid) to the requesting actor. The Cid may be unique among the Cids assigned by the channel actor 36, and thus may identify the corresponding channel unambiguously. The requesting actor may provide the Cid (or "vend" the Cid) to another actor or actors, permitting those actors to communicate with the actor. In an embodiment, the requesting actor may also assign a token (or "cookie") to the channel, which may be used by the actor to verify that the message comes from a permitted actor. That is, the token may verify that the message is being received from an actor to which the requesting actor gave the Cid (or another actor to which that actor passed the Cid). In an embodiment, the token may be inaccessible to the actors to which the Cid is passed, and thus may be unforgeable. For example, the token may be maintained by the channel actor 36 and may be inserted into the message when an actor transmits the message on a channel. Alternatively, the token may be encrypted or otherwise hidden from the actor that uses the channel. In an embodiment, the token may be a pointer to a function in the channel-owning actor (e.g., a capability function or a function implemented by the channel-owning actor).

The channel actor 36 may track various channels that have been created in a channel table 38. The channel table 38 may have any format that permits the channel actor to identify Cids and the actors to which they belong. When a message having a given Cid is received from an actor, the channel actor 36 may identify the targeted actor (the actor that is to receive the message) via the Cid. The channel actor 36 may request activation of the targeted actor and may relay the message to the targeted actor.

An activation of an actor may be an instantiation of an actor to process a message. Each activation may have an associated context 20, that is created when the activation begins execution. Once the activation completes execution on the message, the activation terminates (or is "destroyed"). The context 20 may be deleted when the activation is destroyed. A new execution of the actor may then cause a new activation.

In an embodiment, each actor/capability within an actor may be activated to respond to a given message. The activation may be associated with a context 20, which may be created for the activation if a context for the actor does not yet exist in the contexts 20. Once the activation has completed processing the message, the actor may dissolve, dematerialize, or destroy itself. The dissolving may include deleting the context and closing the thread. Thus, there may be not persistent threads in the system. Each thread may be activated when needed, and dissolve when complete. In other embodiments, threads may be created for each actor/capability. The threads may block, but remain live in the system, after completing processing of a message. Accordingly, the thread may be initialized already, and may have a context 20, when a given message is received for that thread to processor. Unless expressly tied to activation/dissolution herein, various features disclosed herein may be used with the longer-living threads. In such embodiments, an activation may be similar to unblocking a thread and a dissolve may be similar to blocking a thread.

Figure 2:
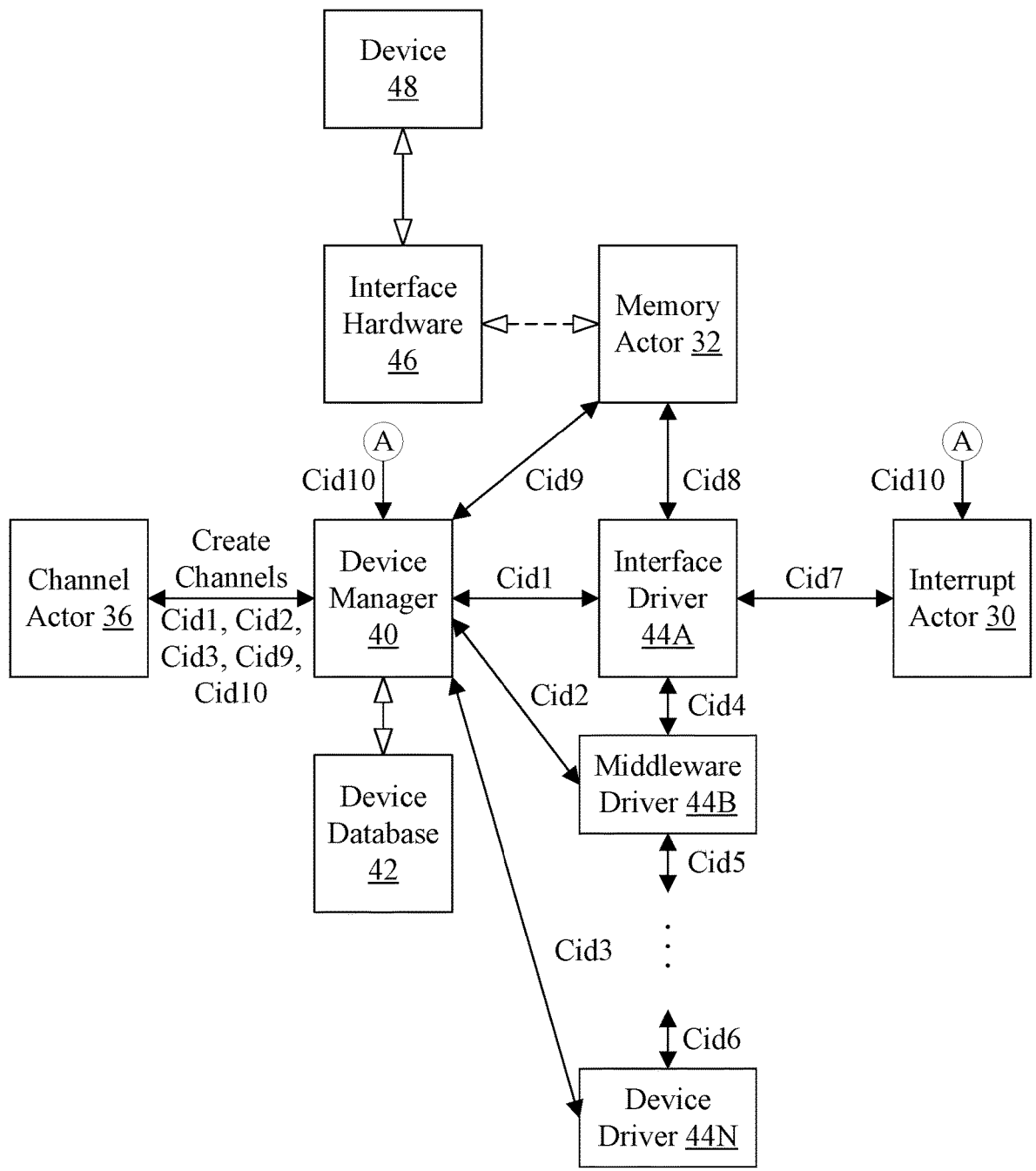
FIG. 2 is a block diagram of one embodiment of a device manager and related actors including one or more device drivers.

In another embodiment, one or more of the base actors (e.g., one or more of the actors 28, 30, 32, 34, and 36) may execute in the privileged mode/space (e.g., on the same side of the dotted line 22 as the kernel 10 in FIG. 2).

FIG. 2 is a block diagram of one embodiment of a portion of the operating system shown in FIG. 1, along with certain hardware devices used by the portion. The embodiment of FIG. 2 includes a device manager 40, a device database 42, and various drivers 44A-44N including an interface driver 44A, a middleware driver 44B, and a device driver 44N. Channels are illustrated in FIG. 2 as lines with solid arrowheads. Open arrowheads may be other types of connections. For example, the device manager 40 may have access to the device database 42, illustrated by the line with open arrowheads between the device manager 40 and the device database 42. Other actors in the system, such as the drivers 44A-44N, may not have access to the device database 42 and thus have no line with open arrowheads to the device database 42. Similarly, the memory actor 32 may have access to the interface hardware 46, illustrated by the dotted line with open arrowheads. The interface hardware 46 may be coupled to a device 48, illustrated by the line with open arrowheads therebetween. The interface hardware 46 and the device 48 may be part of the hardware in the computer system on which the operating system executes. The device manager 40 and the drivers 44A-44N may be examples of other actors 16A-16B shown in FIG. 1.

Accordingly, as illustrated in FIG. 2, the device manager 40 may have a channel to the channel actor 36. The device manager 40 may create channels for the actors which may communicate with the device manager 40 (e.g., the drivers 44A-44N, the interrupt actor 30, and the memory actor 32). Thus, in the illustrated embodiment, the device manager 30 may create channels assigned Cid1, Cid2, Cid3, Cid9, and Cid10 by the channel actor 36. The device manager 30 may vend the Cids to the various actors, and thus may have channels to the interface driver 44A (Cid1), the middleware driver 44B (Cid2), the device driver 44N (Cid3) the memory actor 32 (Cid9) and the interrupt actor 30 (Cid10). Other actors may also create channels as desired, although the creation through the channel actor 36 is not shown in FIG. 2. For example, the device driver 44N may have a channel to the next driver down in the driver stack with Cid6 (in some embodiments, the next driver down may be the middleware driver 44B, in which case Cid6 and Cid5 may be the same channel). The middleware driver 44B has channels to the next drivers above and below the middleware driver 44B (e.g., channels with Cid5 and Cid4 to the interface driver 44A. The interface driver 44A has channels to the interrupt actor 30 (Cid7) and the memory actor 32 (Cid8). Any other channels may be provided as desired.

The device manager 40 may control access to the various devices in the system, such as the interface hardware 46 and the device 48. More particularly, the device manager 40 may obtain resources for each device (e.g., an address space for the device, interrupt assignments for the device, etc.) from the device database 42. The device database 42 may also have permissions for each device, describing which actors may access the device and the extent of access (e.g., read only, read/write, configuration update, etc.). Other actors, such as the drivers 44A-44N, may communicate with the device manager 40 over their respective channels to obtain the resources. If the actor has permission according to the permissions in the device database 42, the device manager 40 may respond on the channel with the requested resources. In one embodiment, the device manager 40 may provide an opaque handle to the resources. The receiving actor may not have direct access to the resources, but may provide the handle to the actor that controls the resource in order to access the resources. For example, the handle may be transmitted to the memory actor 32 to access the memory space for the device. The handle may be transmitted to the interrupt actor 30 to register for the interrupts that are assigned to the device. The actors 30 and 32 may communicate with the device manager 40 to obtain the resource values indicated by the handle. In another embodiment, the actor, such as one of the drivers 44A-44N, may be provided directly with the resource values (e.g., memory address space, interrupts) and may communicate with the memory actor 32 and the interrupt actor 30 using the values. In such an embodiment, the actor may have access to the resource value, but may not be able to allocate resources values itself. That is, the actor may not be able to assign its own address range or interrupts, for example.

Controlling access to devices in this manner may provide for a more secure system, in an embodiment. If resources values are not provided to drivers 44A-44N, only the actor which controls the resource may have the actual value. The drivers 44A-44N may not be able to share the resource values with other actors, in such an embodiment. Additionally, the inability of drivers 44A-44N to allocate resource values for a given device may ensure that the drivers 44A-44N only have access to the device or devices that the operating system intends to permit the drivers 44A-44N to access. Even if resource values are provided, only the resource values supplied by the device manager 40 may be used by the drivers 44A-44N. Other devices to which the drivers 44A-44N have no access may be unaffected by the drivers 44A-44N having the resource values.

Accordingly, the access control and centralization of the hardware resources in the device manager 40 and the device database 42 restricts access to the hardware resources, improving security. Nevertheless, the handle or resource value provided to driver 44A-44N may allow the driver 44A-44N to vend the resource to another (e.g., the memory actor 32 and/or the interrupt actor 30) to operate on the resource on behalf of the driver 44A-44N. The driver 44A-44N may even transfer the resource (e.g., to another level in the driver stack) if the driver no longer has need of direct access to the resource.

Conversely, the device manager 40 may be restricted from directly accessing the hardware resources. That is, another entity (e.g., the driver 44A-44N or another actor with access to the hardware resource) may vend a Cid to the device manager 40 if the device manager 40 is to access the resource, but the device manager 40 may not be able to access the resource with receiving a vended Cid. Security may be further enhanced by the separation of access control (via the device manager 40) and hardware access (via the driver 44A-44N). Cooperation between the device manager 40 and the driver 44A-44N may ensure that a compromise of one of the device manager 40 and the driver 44A-44N (e.g., a hack) may not be sufficient to compromise the system.

In an embodiment, the device manager 40 may synchronize the start of the various drivers 44A-44N. That is, because the device manager 40 is a central repository for device resources (in the device database 42), the device drivers 44A-44N begin start up by requesting their Cids and resources from the device manager 40, the device manager 40 may control the order of start up by controlling the order in which the device manager 40 responds to the device drivers 44A-44N. The device database 42 may include dependency information indicating which device drivers 44A-44N are dependent on each other. For example, the device driver 44A may initialize and control the interface hardware 46, and thus the drivers 44B-44C (which may interact with the interface hardware 46 assuming that it is configured and in operation, or which may interact with the device 48 assuming that the interface hardware 46 is in operation and communicating with the device 48) may be depending on the interface driver 44A. Similarly, the middleware driver 44B may need to be in operation before the device driver 44N. Each device driver 44A-44N may obtain Cids from the device manager 40, and the device manager 40 may respond to a given device driver 44A-44N with its Cids after the dependencies for the given device driver 44A-44N have been cleared (e.g., the corresponding driver/hardware is ready for operation). During initialization of the system (e.g., "boot"), the device drivers 44A-44N may be started in parallel, and the synchronization of delivering the Cids by the device manager 40 may ensure that start up proceeds correctly. The cumbersome and error-prone start up scripts that were previously used may not be needed, in some embodiments.

The centralization of device resources in the device manager 40 may also enhance reliability and maintainability in the system, in an embodiment. The resource values for the devices are located in one location, permitting an update to that one location to take effect throughout the system, rather than searching many different locations in the system for the appropriate values when device drivers 44A-44N are permitted to allocate their resources.

The interface hardware 46 may control a hardware interface to one or more devices. For example, the interface hardware 46 may be a bridge between internal communication mechanisms used in the system and the corresponding interface. The interface hardware 46 may control protocol on the interface, and may include buffers and other hardware to temporarily queue requests and responses to be conveyed on the interface and back to the system. The interface may be an industry standard interface such as peripheral component interconnect (PCI), PCI express (PCIe), universal serial bus (USB), intelligent interchip connection (I²C), system management bus (SMB), parallel or serial ports, etc. The interface may also be a proprietary interface defined by a device vendor or system vendor. The interface hardware may communicate with the device 48 and/or other devices on the interface (not shown in FIG. 2) and provide access to the rest of the hardware system (e.g., processors executing the device drivers).

The device 48 may be any type of peripheral device. A peripheral device may be hardware other than the central processing units (CPUs) in a system that provides various functionality in the system. Such devices may include a memory system (accessed by a memory controller). Devices may include various storage devices such as Flash memory and other non-volatile memory, magnetic storage devices such as disk drives, optical storage devices such as compact disk (CD) and digital video disk (DVD) drives, etc. Devices may include video devices (e.g., graphics processing units (GPUs) that render images, display controllers that drive images onto displays, encoders and decoders, etc.), audio devices (e.g., encoders and decoders, audio controllers, etc.), networking devices, input/output devices such as various human interface devices (e.g., keyboard, mouse, touch enabled devices, etc.), sensors that sense various environmental factors (e.g., cameras, temperature sensors, etc.), etc.

Each device may be controlled by one or more device drivers, such as the device drivers 44A-44N. In the illustrated embodiments, the device drivers may be arranged in a stack such that each device driver interacts with its device through the device drivers below it in the stack. The bottom of the stack may be the interface driver 44A, which may control the interface hardware 46. The interface driver 44A may initialize the interface hardware, writing various configuration registers, for example, in the interface hardware 46. Some devices 48 may not have interface hardware that requires an interface driver, in which case the device driver 44N may be the lowest driver in the stack, or any middleware drivers 44B below the device driver 44N may be the lowest driver in the stack. It is noted that there may be "middleware" drivers similar to driver 44B between the device driver 44N and other operating system software or application software, in some embodiments. There may also be embodiments in which there are no middleware drivers 44B.

The device driver 44N may be the "main" driver for the device, handling the operations expected of the device by various other software executing the system (e.g., application programs). Middleware driver 44B may provide certain specific functions for a given system, intercepting communications from the device driver 44N and potentially modifying the communications or generating additional communications. Middleware drivers 44B may be referred to as "shims," for example. There may be any number of middleware drivers 44B in a stack, in various embodiments. As an example, consider a serial AT attachment (SATA) disk drive that accepts commands from the small computer system interface (SCSI) specification. That is the SATA disk drive may be used as a SCSI device via operation of the driver state. The lowest level driver in the stack (similar to the interface driver 44A in FIG. 2) may be a SATA host bus adapter (HBA) driver, a middleware driver 44B may be a SCSI protocol module, and a higher level device driver may be a SCSI disk driver (similar to the device driver 44N in FIG. 2). The SATA HBA driver may transfer messages and status from the SATA disk drive to the SCSI protocol module. The SCSI protocol module may manage the connection state of the devices behind the HBA, and may transfer commands and requests from the SCSI disk driver to the SATA HBA driver. The SCSI disk driver may transform file system requests (e.g., read a number of bytes at a location) into corresponding SCSI messages and instructs the SCSI protocol module to deliver the message and retrieve the response(s)). Similarly, a SATA digital video (or versatile) disk (DVD) drive may be driven by the SATA HBA driver, have the SCSI protocol module as middleware, and the device driver may be a SCSI DVD driver. Other protocol modules may be used to convert between various other protocols by operating as middleware.

In an embodiment, the interface hardware 46 and the device 48 may be "memory mapped." In such hardware, accesses are performed as reads and writes to certain memory addresses (which would otherwise access the main memory system), but which are mapped by the hardware in the system to the interface hardware 46 or device 48. Thus, various memory addresses may be used to access configuration registers in the interface hardware 46/device 48 (the "configuration space" of the hardware). Other memory addresses may be used to read and write the device itself (e.g., to write a storage device with data). Other embodiments may interface to the device using input/output (I/O) accesses in an I/O address space that is separate from the memory space, or a combination of the I/O and memory-mapped accesses may be used.

While one interface hardware device 46 and device 48 is shown in FIG. 2, various embodiments may have any number of interface hardware devices 46 and devices 48. There may be multiple instances of the same interface hardware/device, as well as various different interface hardware devices/devices, in various embodiments. There may be multiple devices coupled to an interface controlled by the interface hardware 46. There may be device driver stacks for each device, although a device driver may be shared in more than one stack. For example, the interface driver 44A may be shared by device driver stacks for each device which is coupled to that interface (e.g., the device 48 and other devices, not shown).

Figure 3:
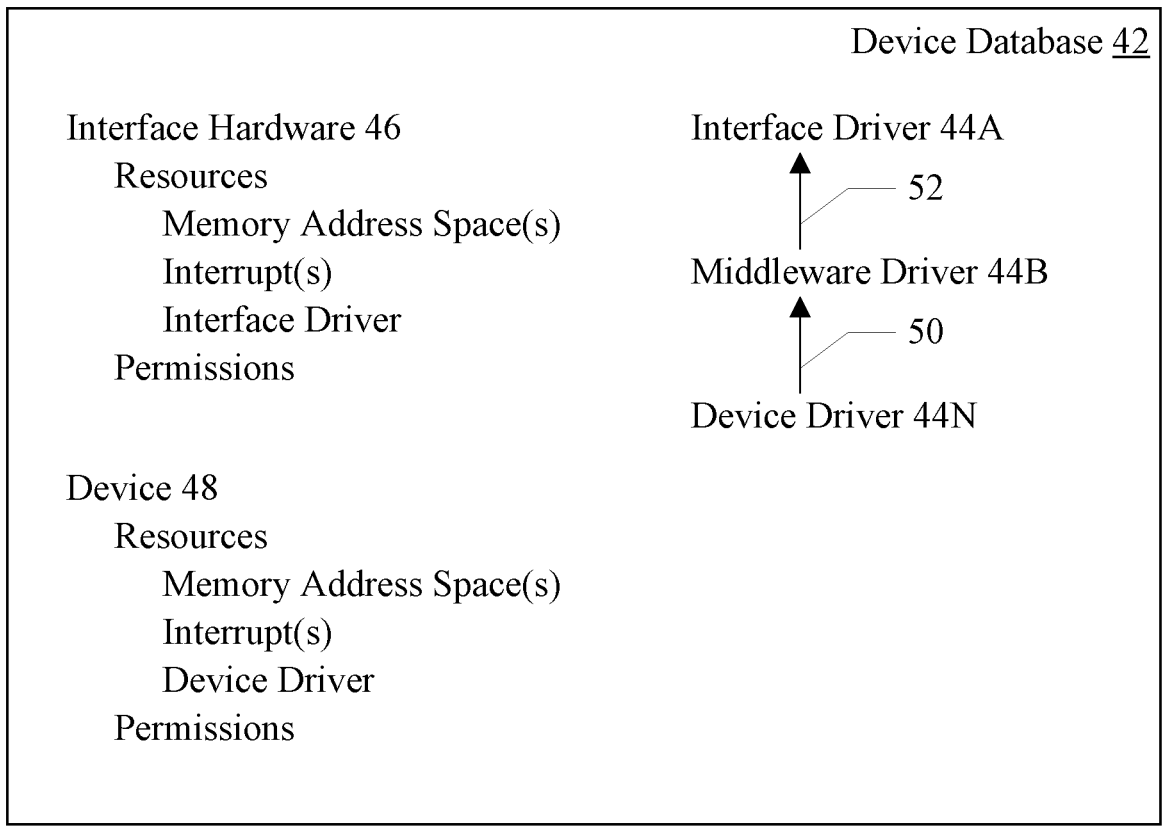
FIG. 3 is a block diagram of one embodiment of a device database.

FIG. 3 is a block diagram of one embodiment of a simplified view of the device database 42. The device database 42 may include an entry for each hardware device in the system. For example, the entries for the interface hardware 46 and the device 48 are shown in FIG. 3. Additionally, for the device drivers in the system, the device database 42 may include data describing dependencies among the device drivers. For example, the device drivers 44A-44C may have their dependencies described, illustrated diagrammatically in FIG. 3 by arrows from the dependent device driver to the driver on which it depends. Thus, the device driver 44N depends on the device driver 44B (arrow 50), which itself depends on device driver 44A (arrow 52). Accordingly, if the device driver 44N transmits a request for Cids to the device manager 40, the response from the device manager 40 supplying the Cids may be delayed until the middleware driver 44B has indicated it is ready for service (i.e. initialization is complete), and the middleware driver 44B may not receive its Cids until the interface driver 44A indicates it is ready for service, so the device driver 44N may be synchronized after the middleware driver 44B and the interface driver 44A.

The entries for the interface hardware 46 and the device 48 may describe the resources allocated to the hardware (e.g., one or more address spaces, one or more interrupts, and a device driver). Any set of resources may be provided for a given device, depending on the definition of the device and the mechanisms used to interface to the device. The device driver for the interface hardware 46 is noted as the interface driver 44A, while the device driver for the device 48 is the device driver 44N. In some embodiments, more than one device driver may be specified for a device. For example, the middleware driver 44B may be specified for the device 48 in addition to the device driver 44N. Alternatively, the additional drivers such as the middleware driver 44B may be identified via the dependency data illustrated by the arrows 50 and 52.

In one embodiment, the entries and driver dependency data in the device database 42 may be populated prior to the system start up, and may be static during operation. That is, changes to the device database 42 may be made while the system is down. In other embodiments, the device database 42 may be changed dynamically during operation. Since the device manager 40 is the only actor which may directly access the device database 42, the device manager 40 may carry out the dynamic updates. The device manager 40 may be trusted, and may authenticate any requests to change the device database 42. If the device manager 40 does not successfully authenticate the requestor, the device manager 40 may prevent the change.

Figure 4:
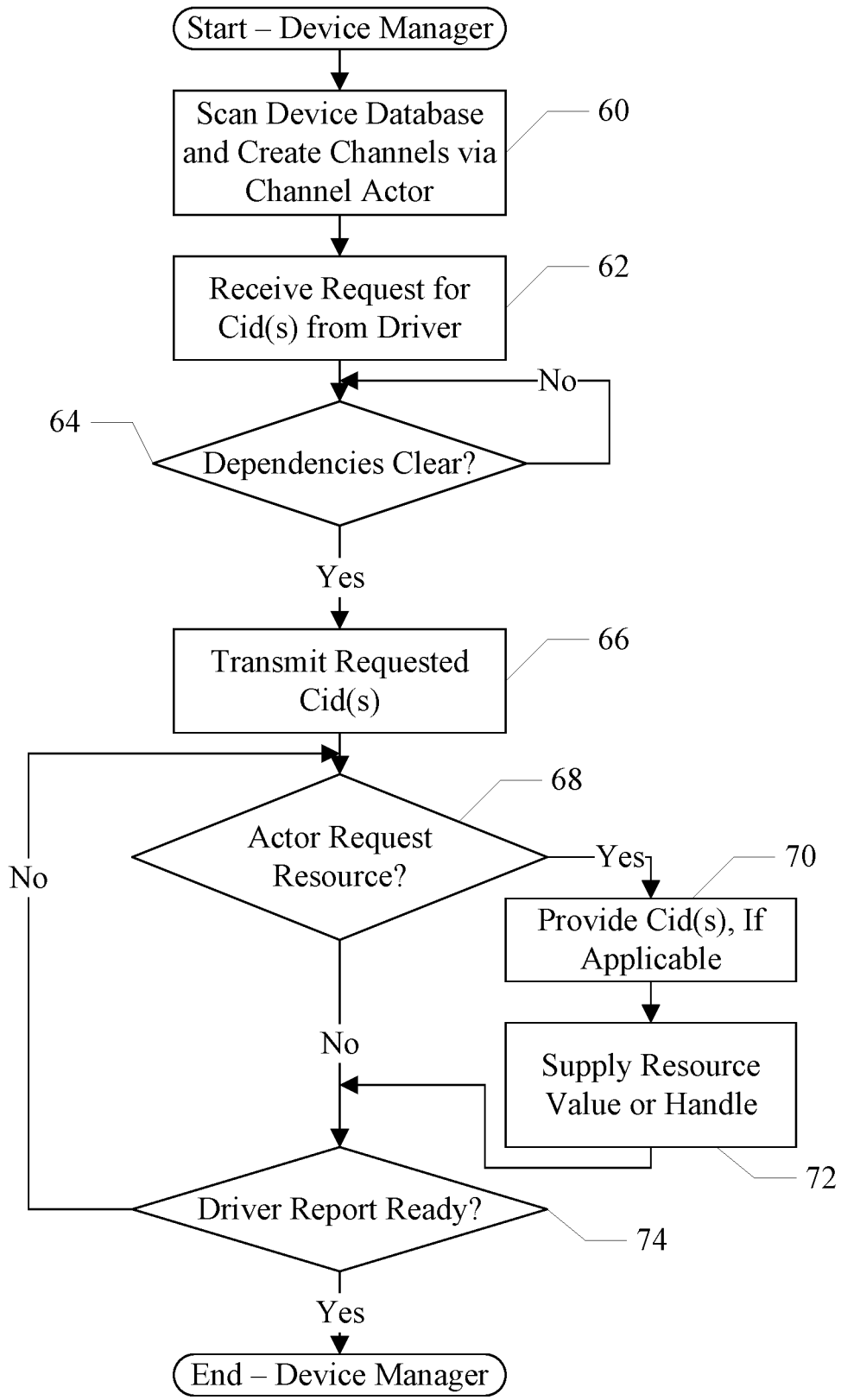
FIG. 4 is a flowchart illustrating operation of one embodiment of the device manager during system initialization.

FIG. 4 is a flowchart illustrating operation of one embodiment of the device manager 40. While the blocks are shown in a particular order for ease of understanding, other orders may be used. The device manager 40 may include instructions which, when executed, implement the operation illustrated in FIG. 4. That is, the device manager 40 may be configured to implement the operation shown in FIG. 4.

During initialization of the system, the device manager 40 may scan the device database and create channels for the device drivers, such as the device drivers 44A-44N (block 60). The device manager 40 may create the channels by transmitting create channel requests to the channel actor 36.

As mentioned previously, the device drivers 44A-44N may be started in parallel, or at least the device drivers 44A-44N may be started without concern for whether all dependencies have been met. As the device drivers 44A-44N begin execution, they may transmit requests to the device manager 40 for their Cids (block 62). For a given device driver 44A-44N, the device manager 40 may check if the dependencies described in the device database 42 have cleared (decision block 64). If not (decision block 64, "no" leg), the device manager 40 may delay the response to the device driver's request. In an embodiment, the device manager 40 may block for the device driver if its dependencies are not cleared. The device manager 40 may periodically check the dependencies again (e.g., after a given device driver has reported it is ready) until the dependencies for the device driver have cleared.

If the dependencies have cleared (decision block 64, "yes" leg), the device manager 40 may respond to the device driver 44A-44N with its Cid or Cids (block 66). The device manager 40 may wait for the device driver 44A-44N to report ready. During the wait, one or more actors may request a resource (decision block 68, "yes" leg). In some cases, the request for a resource may cause the device manager 40 to deliver one or more additional Cids to the requesting actor (block 70). Additionally, the device manager 40 may respond to the actor request with the resource value, or a handle to the resource value (block 72). Whether the device manager 40 returns a handle or a value may depend on which actor is making the request and may further depend on the design of the device manager 40. For example, the device manager 40 may be designed to return a handle if the request is from the device driver 44A-44N. Alternatively, the device manager 40 may be designed to provide resource values to the device driver 44A-44N. The device manager 40 may return a mix of handles and values, depending on which specific resource is requested by the device driver 44A-44N. In another embodiment, the device manager 40 may be designed to provide handles to any actor that is not the base actor for that resource. Thus, for example, a request for a memory address resource for a device may result in a handle return unless the request is from the memory actor 32, in which case the address range may be returned. Any mechanism for providing a handle or a resource value for a given request may be used, based on a desired level of security and performance tradeoffs to achieve that level of security.

Operation of the device manager 40 may continue, responding to resource requests, until the device driver 44A-44N which transmitted the request for Cids (block 62) reports that it is ready for execution (i.e. device initialization is complete) (decision block 74, "no" leg return to blocks 68, 70, and 72). When the device driver reports read (decision block 74, "yes" leg), the device manager 40 is complete for this device driver. In some embodiments, the device manager 40 may check other device drivers for dependency clearance in response to the device driver 44A-44N reporting ready.

A handle may be a pointer to a resource value. The handle may be opaque, meaning the receiver of the handle may not access the resource value itself. However, the receiver may provide the handle to another actor (e.g., the base actor for the resource) so that the other actor may access the resource value.

For embodiments that dynamically modify the device drivers or devices in the system, the operation illustrated in FIG. 4, blocks 62, 64, 66, 68, 70, 72, and 74 may be performed at any point in time responsive to a device driver's request for new Cids for the new device or the changed device database values.

Figure 5:
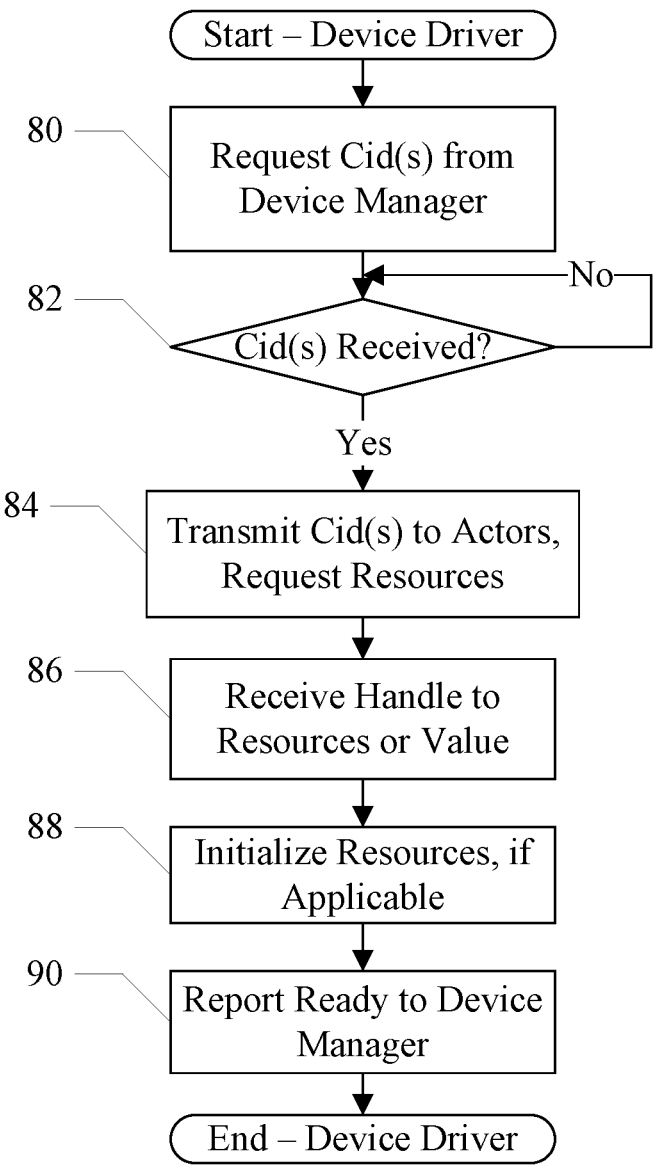
FIG. 5 is a flowchart illustrating operation of one embodiment of a device driver during system initialization.

FIG. 5 is a flowchart illustrating operation of one embodiment of a device driver 44A-44N during initialization of the system. While the blocks are shown in a particular order for ease of understanding, other orders may be used. The device driver 44A-44N may include instructions which, when executed, implement the operation illustrated in FIG. 5. That is, the device driver 44A-44N may be configured to implement the operation shown in FIG. 5.

The device driver 44A-44N may request one or more Cids from the device manager 40 (block 80). The Cids may include Cids identifying channels to the device resources in the device database 42 (although the device manager 40 may communicate on the channels to the device driver 44A-44N, i.e. the device driver 44A-44N may not have access to the device database 42 directly through the Cid), channels to other actors, etc. The device driver 44A-44N may wait for the response from the device manager 40 with the Cids (decision block 82). The operation of block 82 may be implemented by the thread of the device driver 44A-44N blocking, in an embodiment. Once the Cids have been received (decision block 82, "yes" leg), the device driver 44A-44N may transmit the Cids to the various actors, and may request resources (block 84). The device driver 44A-44N may receive the handle to the resources, or the resource value (block 86). The device driver 44A-44N may communicate to the various actors that control the resources, supplying the handle or the resource value and initializing the resources (and the device itself) as desired (block 88). Once initialization is complete, the device driver 44A-44N may report ready to the device manager 40 (block 90).

Figure 6:
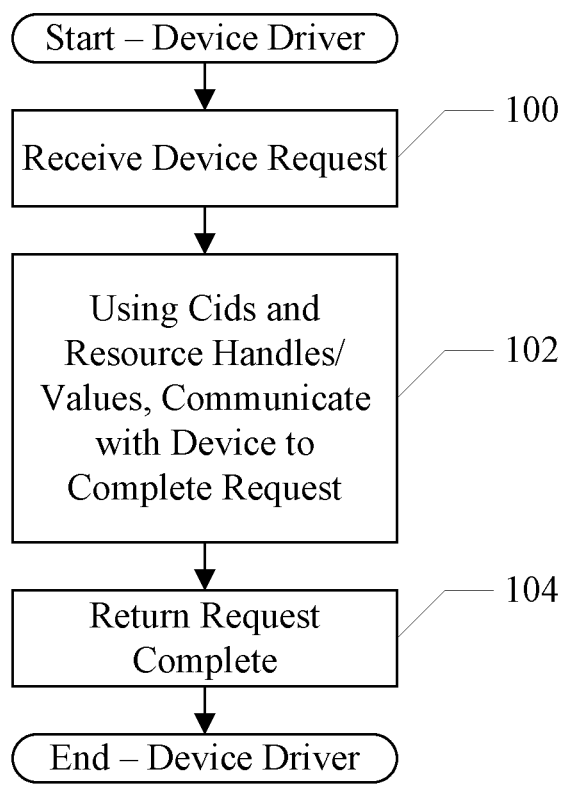
FIG. 6 is a flowchart illustrating operation of one embodiment of the device driver during operation.

FIG. 6 is a flowchart illustrating operation of one embodiment of a device driver 44A-44N during normal operation of the system (e.g., after system initialization is complete and the system is in operation). While the blocks are shown in a particular order for ease of understanding, other orders may be used. The device driver 44A-44N may include instructions which, when executed, implement the operation illustrated in FIG. 6. That is, the device driver 44A-44N may be configured to implement the operation shown in FIG. 6.

The device driver 44A-44N may receive a request from the operating system or an application to access a device (block 100). Using the Cids and resource handles/values provided to the device driver 44A-44N, the device driver 44A-44N may communicate with the device to complete the request (block 102). The device driver 44A-44N may return a response to the requesting operating system/application indicating completed when the request has completed (block 104).

Figure 7:
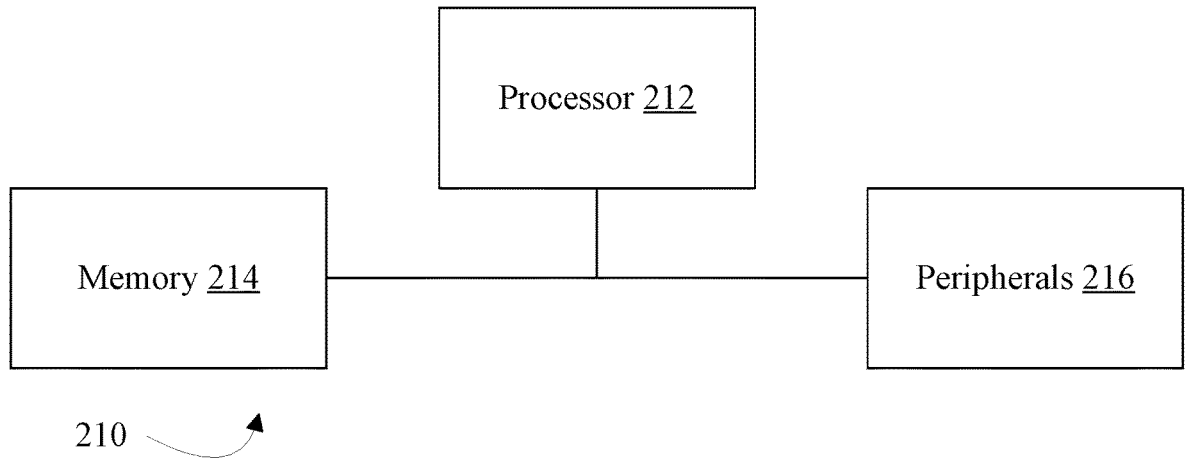
FIG. 7 is a block diagram of one embodiment of a computer system.

Tuning now to FIG. 7, a block diagram of one embodiment of an exemplary computer system 210 is shown. In the embodiment of FIG. 7, the computer system 210 includes at least one processor 212, a memory 214, and various peripheral devices 216. The processor 212 is coupled to the memory 214 and the peripheral devices 216.

The processor 212 is configured to execute instructions, including the instructions in the software described herein such as the various actors, capabilities functions, device manager 40, device drivers 44A-44N, etc., and/or the kernel 10. In various embodiments, the processor 212 may implement any desired instruction set (e.g., Intel Architecture-32 (IA-32, also known as x86), IA-32 with 64 bit extensions, x86-64, PowerPC, Sparc, MIPS, ARM, IA-64, etc.). In some embodiments, the computer system 210 may include more than one processor. The processor 212 may be the CPU (or CPUs, if more than one processor is included) in the system 210. The processor 212 may be a multi-core processor, in some embodiments.

The processor 212 may be coupled to the memory 214 and the peripheral devices 216 in any desired fashion. For example, in some embodiments, the processor 212 may be coupled to the memory 214 and/or the peripheral devices 216 via various interconnect. Alternatively or in addition, one or more bridges may be used to couple the processor 212, the memory 214, and the peripheral devices 216.

The memory 214 may comprise any type of memory system. For example, the memory 214 may comprise DRAM, and more particularly double data rate (DDR) SDRAM, RDRAM, etc. A memory controller may be included to interface to the memory 214, and/or the processor 212 may include a memory controller. The memory 214 may store the instructions to be executed by the processor 212 during use, data to be operated upon by the processor 212 during use, etc.

Figure 8:
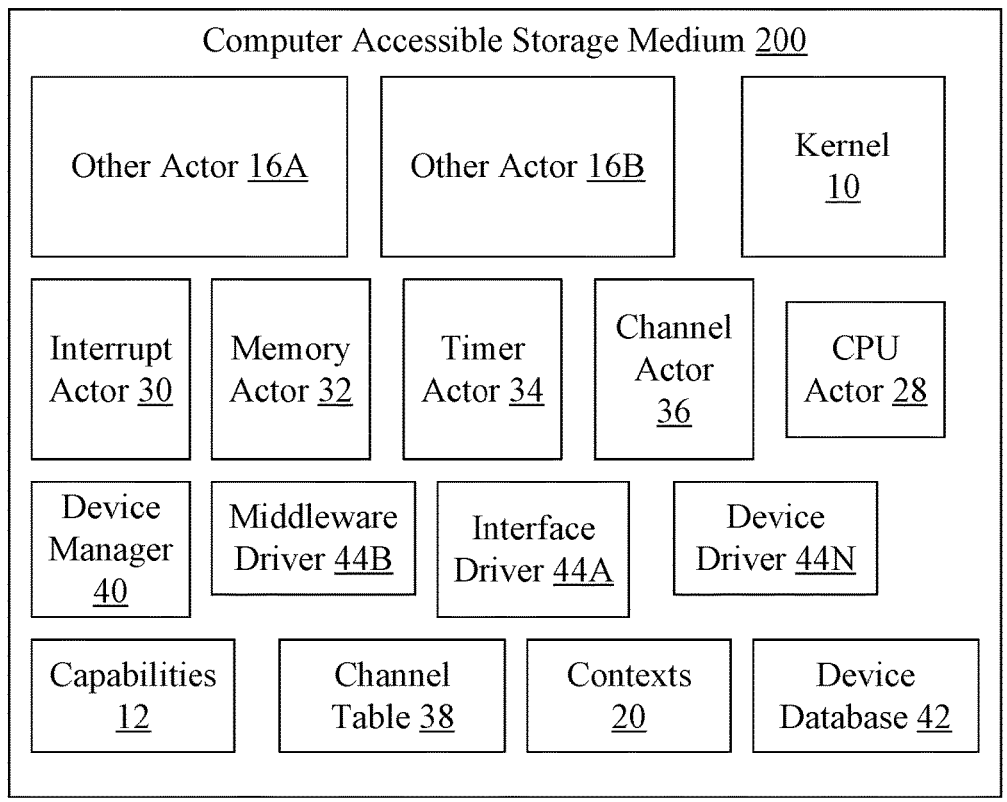
FIG. 8 is a block diagram of one embodiment of a computer accessible storage medium.

Peripheral devices 216 may represent any sort of hardware devices that may be included in the computer system 210 or coupled thereto (e.g., storage devices, optionally including a computer accessible storage medium 200 such as the one shown in FIG. 8), other input/output (I/O) devices such as video hardware, audio hardware, user interface devices, networking hardware, various sensors, etc.). Peripheral devices 216 may further include various peripheral interfaces and/or bridges to various peripheral interfaces such as peripheral component interconnect (PCI), PCI Express (PCIe), universal serial bus (USB), etc. The interfaces may be industry-standard interfaces and/or proprietary interfaces. In some embodiments, the processor 212, the memory controller for the memory 214, and one or more of the peripheral devices and/or interfaces may be integrated into an integrated circuit (e.g., a system on a chip (SOC). The interface hardware 46 and the device 48 may be representative of various peripheral devices 216.

The computer system 210 may be any sort of computer system, including general purpose computer systems such as desktops, laptops, servers, etc. The computer system 210 may be a portable system such as a smart phone, personal digital assistant, tablet, etc. The computer system 210 may also be an embedded system for another product.

FIG. 8 is a block diagram of one embodiment of a computer accessible storage medium 200. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 200 in FIG. 8 may store code forming the various actors 16A-16B, 28, 30, 32, 34, and 36, the kernel 10, the device manager 40, the device drivers 44A-44N, and/or the functions in the capabilities 12. The computer accessible storage medium 200 may still further store one or more data structures such as the device database 42, the channel table 38, and the contexts 20. The various actors 14A-14C, 28, 30, 32, 34, and 36, the kernel 10, the device manager 40, the drivers 44A-44N, and/or the functions in the capabilities 12 may comprise instructions which, when executed, implement the operation described above for these components. A carrier medium may include computer accessible storage media as well as transmission media such as wired or wireless transmission.

Authentication Overview

In some embodiments described above, the device manager 40 starts the drivers 44A-44N and thus can trust the drivers 44A-44N when the drivers 44A-44N later begin requesting their resources. In other embodiments, the device manager 40 may not start the drivers 44A-44N. For example, an embodiment may include a launcher/loader actor (or process, in the embodiments below) which starts the device manager 40 and the drivers 44A-44N. In such an embodiment, there is not an inherent chain of trust from the device manager 40 to the drivers 44A-44N. In an embodiment, the system may include an authenticator that controls access rights/permissions in the system. The authenticator may be started by the launcher/loader as well, and the launcher/loader may provide other processes, such as the drivers 44A-44N and/or the device manager 40, with a handle to the authenticator. Because the handle comes from the launcher/loader, the device manager 40 and the drivers 44A-44N may trust the handle. Also, the device manager 40 may receive a handle to the authenticator, and may verify access rights asserted by the drivers 44A-44N with the authenticator. In this way, a chain of trust may be developed between the drivers 44A-44N and the device manager 40.

In an embodiment, the access rights for a system may be maintained in a central repository (the authenticator). In this description, access rights are referred to as "entitlements," since the rights are conferred on an accessing entity with respect to a given access-controlled entity. Generally, the entitlements of an accessing entity may control which interactions with an access-controlled entity are permitted for the accessing entity. The interactions may be access-controlled-entity specific. For example, a server may support two or more services. The entitlements for the accessing entity may specify which services the accessing entity is permitted to request. A file may have read, write, and execute entitlements. Thus, an accessing entity may have read, write, and execute interactions controlled independently. A hardware device may have access/no access entitlements, configuration change entitlements, and/or transmit/receive entitlements. An accessing entity may be permitted or denied access based on the access/no access entitlements. The accessing entity may be permitted or denied configuration change requests based on the configuration change entitlements. The accessing entity may be permitted or denied transmission or reception based on the transmit/receive entitlements Any set of interactions may be supported on an accessing-entity basis. Additionally, while examples are described in greater detail below with regard to an accessing entity and an access-controlled entity, entitlements may be applied in both directions for peers (e.g., each peer may be an accessing entity to the other peer, based on a set of entitlements). Furthermore, the controlled access is not limited to two entities, but may rather control interaction among three or more entities. For example, each entity may have a set of entitlements for each other entity in the interaction.

In an embodiment, the central repository may have a set of entitlements that are assigned at the time that the operating system and other software components of the system are built. In some embodiments, the entitlements may be changed dynamically during use, but begin with the set that was created during the build. In an embodiment, an accessing entity may vend its entitlements to another entity, and may further limit the entitlements (but may not expand them). In an embodiment, expansion of entitlements for a given accessing entity may be controlled by the accessed entity, or may be controlled by the accessed entity in conjunction with the authenticator or other trust-controlling entity. In other embodiments, the entitlements may be set at build and may not be dynamically changed.

An example will be described in greater detail below, using a client and a server and client entitlements with respect to the server. However, other embodiments may employ any accessing entity and accessed entity and/or any combination of accessing entities and accessed entities.

Figure 9:
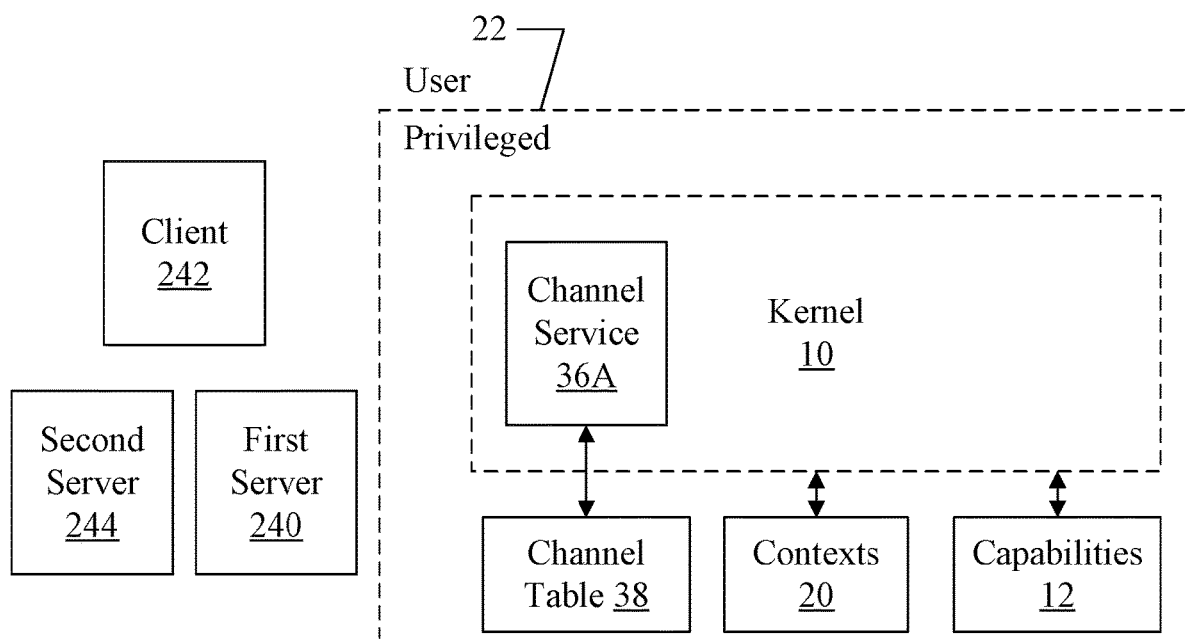
FIG. 9 is a block diagram of another embodiment of an operating system in accordance with this disclosure.

FIG. 9 is another embodiment of an operating system (and clients and servers that may execute with the operating system). In the illustrated embodiment, the kernel 10 is shown in the privileged space and the client 242 and servers 240 and 244 are in user space, separated by the dotted line 22 similar to FIG. 1.

The kernel 10 may manage contexts 20, as previously described. Additionally, the kernel 10 may further include code to provide certain services that were provided by actors in user space in the embodiment of FIG. 1. For example, the channel service 36A may manage channels by which various clients and servers may communicate with each other and with operating system services. Accordingly, the client 242 and the servers 240 and 244 may have channels to the channel service 36A in order to request additional channels, delete existing channels, etc. The channel service 36A may store channel data in the channel table 38, which may lie in privileged space as well in this embodiment.

The capabilities 12 may also reside in the privileged space 22. The capabilities 12 may serve as the foundation for the various operating system services employed by the kernel 10. The capabilities 12 may further serve as the foundation for the clients and servers in the system, in some embodiments. In some cases, capabilities that are used only by clients and servers in user space may also be stored in user space. In other embodiments, the kernel 10 may not be capabilities-based.

Other services of the kernel 10 may include an interrupt service, a memory service, a timer service, and a CPU service. These services may provide the operation previously discussed for the actors 30, 32, 34, and 28, respectively. There may be still further services, and the above mentioned services may be expanded beyond the base services described previously.

Figure 10:
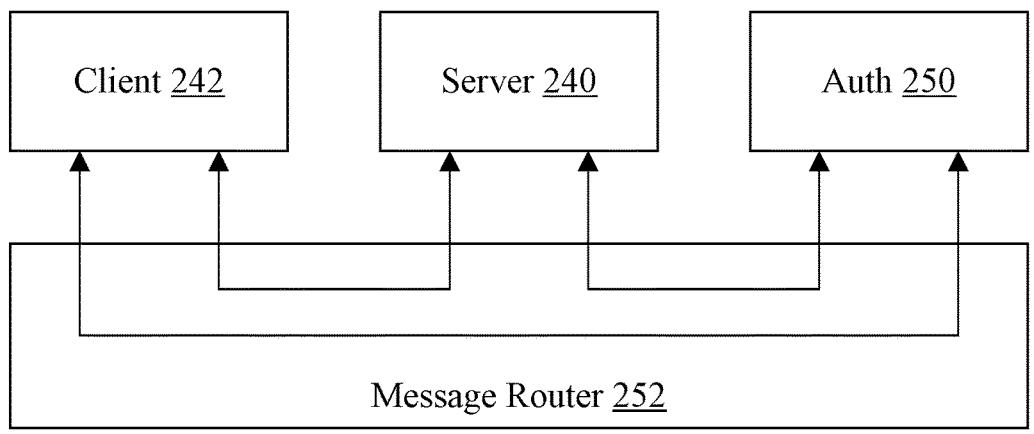
FIG. 10 is a block diagram of one embodiment of communication between clients, servers, and an authenticator.

FIG. 10 is a block diagram of one embodiment of components of a system that may implement entitlements. As illustrated in FIG. 10, the components may include a client 242, a server 240, an authenticator (auth) 250, and a message router 252. The various components may be executed on one or more computer systems. If more than one computer system is used, the message router 252 may be executed on each computer system and may communicate with the message router 252 on other computer systems to route messages between the client 242, the server 240, and the auth 250. If the client 242, the server 240, and the auth 250 are all executed on the same computer system, the message router 252 may be the operating system on the computer system (or may be part of the operating system). For example, the channel agent 36 and/or the channel service 36A may be examples that include features for the message router 252.

Communication between components (e.g., the client 242, the server 240, and the auth 250) may be in the form of messages that are communicated via the message router 252. For example, components that wish to communicate may establish channels in the message router 252. The message router 252 may assign a channel identifier (Cid) to the channel, and the transmitting component may use the Cid in the message to identify the receiving component. In an embodiment, the owner of the channel (the component which establishes the channel) may associate a token with the channel. The token may be unforgeable (that is, no other entity may know the token, it may be hidden in the message). The token may help the channel owner in determining that the message was indeed from the entity to which the channel was formed, or for from another entity to which that entity vended the channel, if permissible.

In an embodiment, a client 242 may request and receive an authentication (auth) "handle" that may be used to identify the client's entitlements for a given server 240. That is, the handle is not just a handle to a set of entitlements, but also indicates the client's ownership of the entitlements. The handle may be opaque, meaning that the handle cannot be used to view the actual entitlements. The client 242 may use the handle to identify the entitlements that the client 242 has for the given server 240, e.g., by transmitting the handle to the server 240.

It is noted that, while a client 242 and a server 240 are illustrated in FIG. 10, the same components may reverse roles for another interaction. That is, the component acting as the client 242 in one interaction may be the server 240 in another interaction, and the server 240 may be the client 242 in that other interaction.

Figure 11:
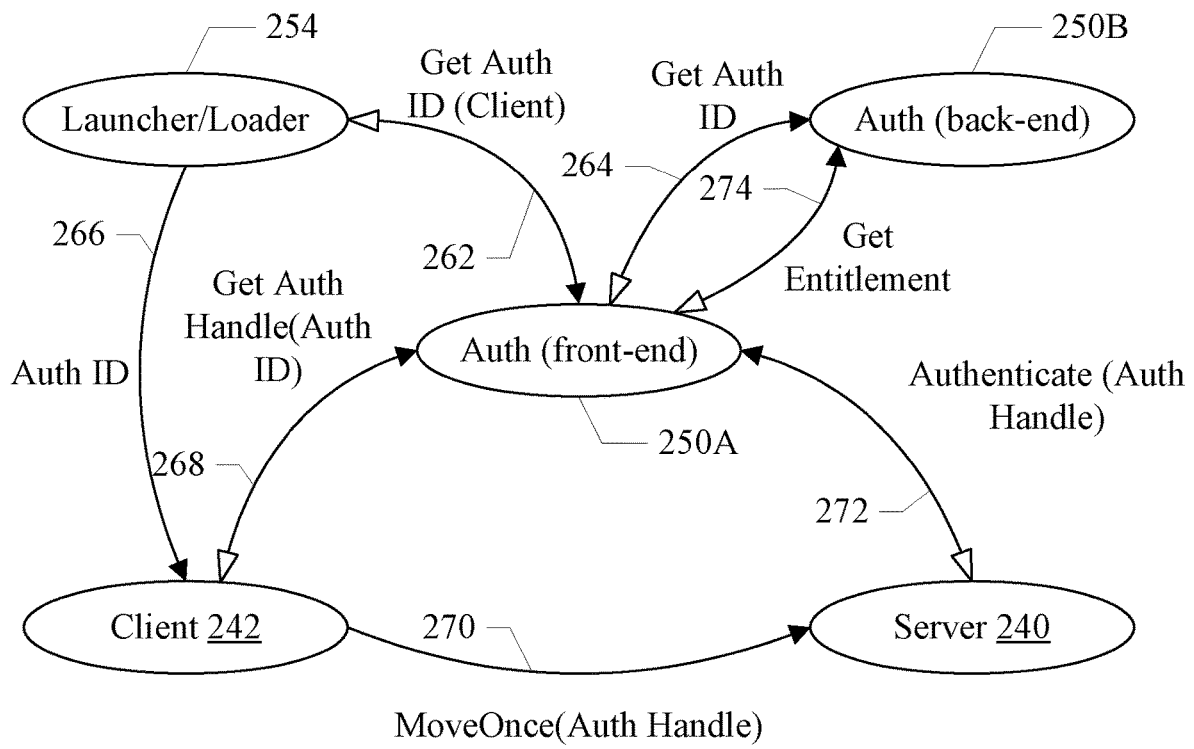
FIG. 11 is a state machine illustrating interaction of certain components shown in FIG. 10 for an embodiment.

FIG. 11 is a block diagram illustrating one embodiment of communications among the client 242, server 240, auth 250, and a launcher/loader 254 to manage entitlements and authentication of the entitlements in a system. The auth 250 is shown in two portions, a front-end 250A and a back-end 250B. The arrows in FIG. 11 represent communications between the various entities (e.g., a channel between the entities). An arrow with a closed head (black) illustrates a command or request channel, and an arrow with an open head (white) illustrates a response channel. The command/ request channel and the response channel may be the same channel, or may be separate channels, in various embodiments.

The launcher/loader 254 may be the code that initializes a system or systems to execute the client 242, the server 240, and the auth 250. The launcher/loader 254 may also load the code corresponding to the client 242, the server 240, and the auth 250 into memory in the system and thus provides the beginning of a chain of trust between the launcher/loader 254 to the client 242, the server 240, and the auth 250.

As mentioned above, the auth 250 is illustrated in FIG. 11 as the auth front-end 250A and the auth back end 250B. The auth front-end 250A may include the interfaces to other entities in the system and may manage messages from the various client and server entities in the system for verifying entitlements. The auth back-end 250B may include the management of the entitlements for the clients. In one embodiment, an entitlement may be a key-value pair. The value may be defined by the server 240 or other access-controlled entity, and thus may differ for different servers/ entities. In such embodiments, the auth 250 may not attempt to interpret the entitlement, but may instead provide the entitlement to the server 240 to interpret.

When launcher/loader 254 is launching the client 242, the launcher/loader 254 may request an auth ID from the auth front-end 250A (arc 262). The request may include a name of the client 242, which may be used to identify the client to assign the auth ID. The auth ID may identify the client in the auth ID system for authentication/entitlement requests. The auth front-end 250A may transmit a message to the auth back-end 250B to obtain the auth ID, which the auth back end may return (arc 264) to the auth front-end 250A. The auth front-end 250A may return the auth ID to the launcher/ loader 254 (arc 262). The launcher/loader 254 may transmit the auth ID to the client 242 when launching the client 242 (arc 266).

When the client 242 is to employ a service from the server 240, the client 242 may request a handle to its entitlements from the auth front-end 250A (arc 268). The request may include the auth ID of the client 242 and a key that identifies the server 240 among various servers or other entities to which the client 242 may have entitlements. The may be a public key associated with the server 240, for example. Alternatively, the key may be any identifier which uniquely identifies the server among the entities for which the auth 250 has entitlements. As mentioned above, the auth handle identifies not only the entitlements, but the client's ownership of those entitlements, and thus is labeled as an auth handle in FIG. 11. The auth front-end 250A may respond with the auth handle. The auth handle may be opaque to the client 242. That is, the client 242 may not be able to view its entitlements. Security in the system may be improved by keeping the value secret from the client 242 (and thus the value that would represent other entitlements may not be inferred by the client 242 or other entities which attempt to monitor communications to detect the entitlement values supported by the server 240).

The client 242 may transmit the auth handle using a move once message to the server 240 (arc 270). A move once message may permit a given object to be moved from the source (e.g., client 242) to the destination (e.g., server 240). The destination may receive the move once message and may use the contents (e.g., to read the entitlements from the auth system 250) but cannot transmit the auth handle to another entity except the entity that created the object (e.g., the auth 250, in this case). The move once operation may be enforced by the message router 252. Since the auth handle cannot be moved by the receiver of the move once message, the receiver may not attempt to impersonate the client 242 to other entities. Viewed in another way, the receiver of a move once message may transmit the contents of the message (the auth handle) to the source of the contents (the auth 250 in this case) but may not transmit them elsewhere. In other embodiments, other semantics than the move once semantics may be used.

The server 240 may transmit an authenticate message to the auth front-end 250A including the handle, to obtain the entitlements for the client 242 (arc 272). The auth front-end 250A may query the auth back-end 250B to obtain the entitlement (arch 274) and may return the entitlement to the server 240 (arc 272).

In an embodiment, the channels represented by the arcs 262, 264, 266, 268, 270, 272, and 274 may be managed by yet another entity (a channel entity) that establishes channels and assigns channel IDs and tokens to the channels. The tokens may be unforgeable, and may thus serve as evidence that the message transmitter is using the channel that was assigned to the transmitter by the channel entity.

Figure 12:
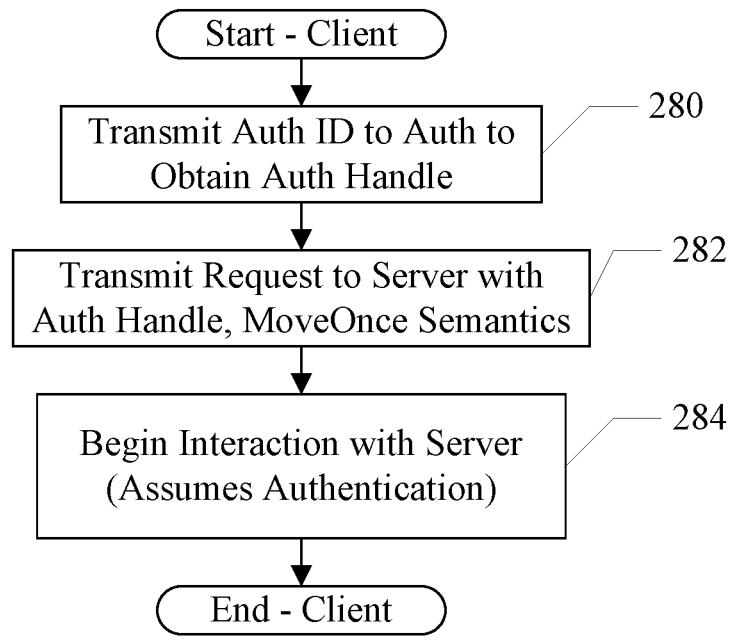
FIG. 12 is a flowchart illustrating operation of one embodiment of the client in the communication mechanism of FIG. 11.

Turning now to FIG. 12, a flowchart is shown illustrating operation of one embodiment of the client 242 for the embodiment of FIG. 11. While the blocks are shown in a particular order for ease of understanding, other orders may be used. The client 242 may include instructions which, when executed, cause a computer to implement the operation shown in FIG. 12. The client 242 may be configured to implement the operation shown in FIG. 12.

The client 242 may transmit the auth ID provided by the launcher/loader 254 in a get auth handle command (block 280). As mentioned previously, the command may include a key for the server 240 (e.g., the public key of a public/private key pair in an embodiment) to identify the server among the entitlements that may be available for the client 242. That is, the client 242 may have entitlements for multiple different servers 240. When the auth handle is returned to the client 242 from the auth front-end 250A, the client 242 may transmit a command to authenticate with the server 240, providing the auth handle in the message and using the move once message type mentioned above (block 282). Assuming that the authentication is successful (i.e. the client 242 indeed has the entitlements needed for the desired interaction with the server 240), the client 242 may begin interaction with the server 240 (block 284). The interactions will be controlled by the entitlements received by the server 240 from the auth 250. That is, if the client 242 is not permitted a particular interaction based on the entitlements, the particular interaction may fail even though other interactions operate successfully.

Figure 13:
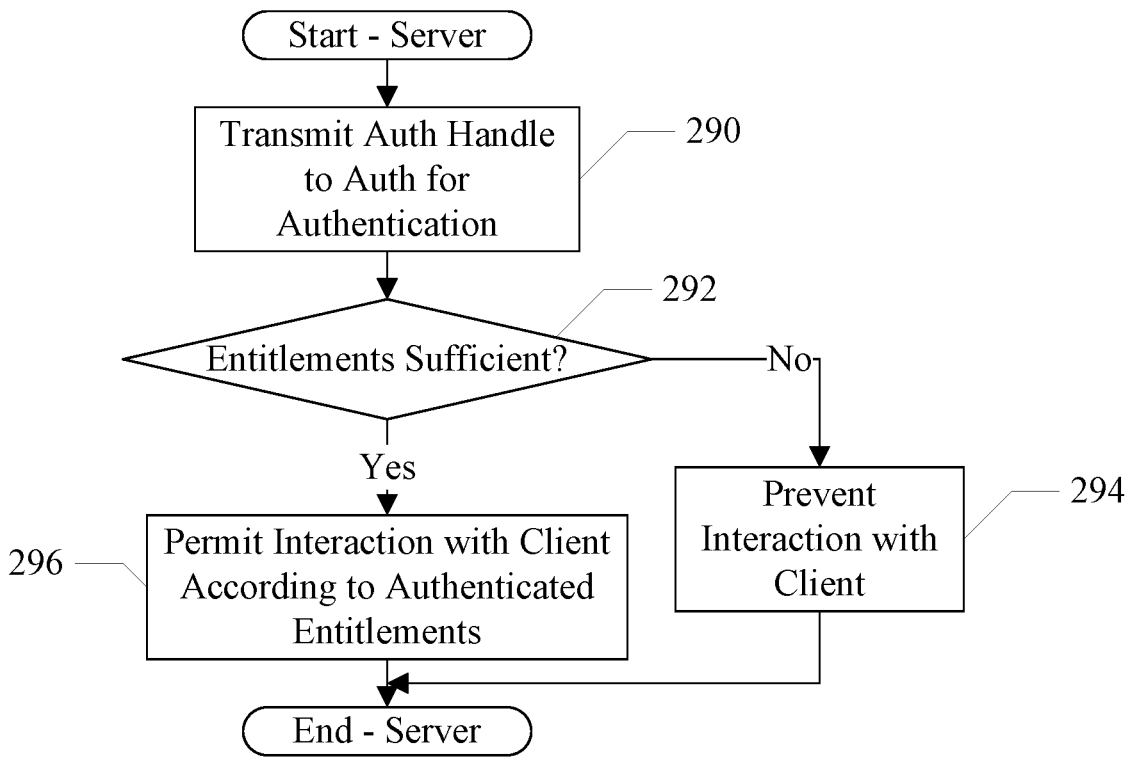
FIG. 13 a flowchart illustrating operation of one embodiment of the server in the communication mechanism of FIG. 11.

FIG. 13 is a flowchart illustrating one embodiment of the server 240 for the embodiment of FIG. 11. While the blocks are shown in a particular order for ease of understanding, other orders may be used. The server 240 may include instructions which, when executed, cause a computer to implement the operation shown in FIG. 13. The server 240 may be configured to implement the operation shown in FIG. 13.

In response to receiving the auth handle from the client 242, the server 240 may transmit the handle to the auth front-end 250A for authentication (block 290). The server 240 may receive the corresponding entitlements back from the auth front-end 250A, and may determine if the entitlements are sufficient to permit the client 242 to interact with the server 240. If the entitlements are not sufficient for any interaction (decision block 292, "no" leg), the server 240 may prevent any interaction with the client 242 (block 294). For example, messages from the client 242 may ignored. If the entitlements are sufficient (decision block 292, "yes" leg), the server 240 may permit interaction with the client 242 according to the authenticated entitlements (block 296).

Figures 14, 15, 16:
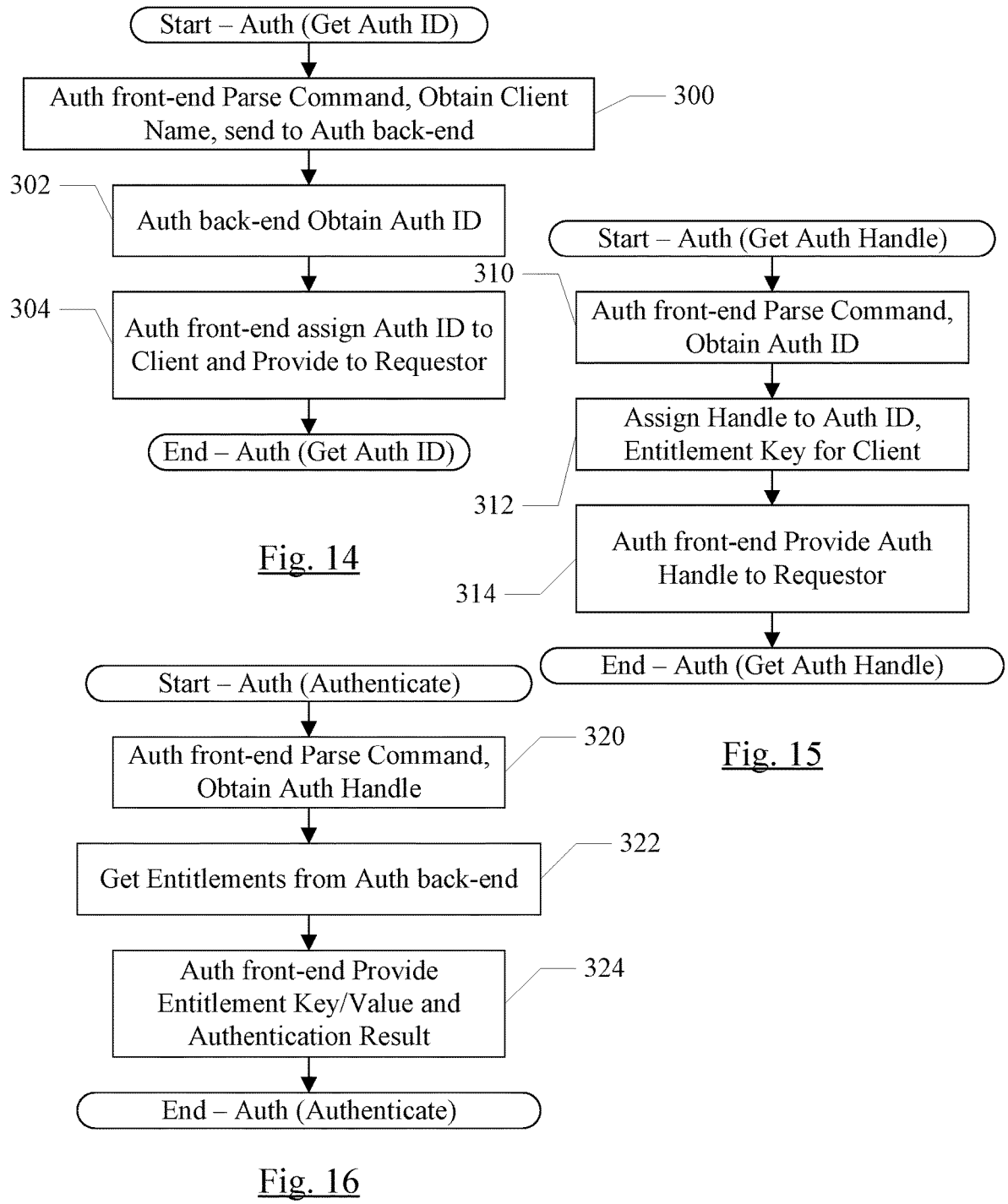
FIGS. 14-16 are flowcharts illustrating operation of one embodiment of the authenticator in the communication mechanism of FIG. 11.

FIGS. 14-16 are flowcharts illustrating operation of one embodiment of the auth 250 for the embodiment of FIG. 11. While the blocks are shown in a particular order for ease of understanding, other orders may be used. The auth 250 (more particularly the auth front-end 250A and the auth back-end 250B) may include instructions which, when executed, cause a computer to implement the operation shown in FIGS. 14-16. The auth front-end 250A and the auth back-end 250B may be configured to implement the operation shown in FIGS. 14-16.

FIG. 14 illustrates one embodiment of operation of the auth 250 in response to a Get Auth ID command from the launcher/loader 254. The auth front-end 250A may parse the command to determine that it is the Get Auth ID command, and may obtain the client name. The auth front-end 250A may send the client name to the auth back-end 250B (block 300). The auth back-end 250B may obtain the auth ID for the client based on the client name, and may return the auth ID to the auth front-end 250A (block 302). The auth front-end 250A may assign the auth ID to the client 242 and may return the auth ID to the requestor (block 304). In this case, the requestor may be the launcher/loader 254.

FIG. 15 illustrates one embodiment of operation of the auth 250 in response to a Get Auth Handle command from the client 242. The auth front-end 250A may parse the command to determine that it is the Get Auth Handle command, and may obtain the auth ID from the command (block 310). The auth front-end 250A may assign a handle to the auth ID (block 312), which may be opaque to the client 242. That is, the client 242 may not use the handle to access the entitlements. In an embodiment, the auth front-end 250A may not even communicate the auth ID to the auth back-end 250B to obtain the entitlements. Instead, the auth front-end 250A may record the handle with the auth ID and the key provided by the client 242. The auth front-end 250A may respond to the client 242 with the handle (block 314).

FIG. 16 illustrates one embodiment of operation of the auth 250 in response to an Authenticate command from the server 240. The auth front-end 250A may parse the command to determine that it is the Authenticate command, and may obtain the auth handle (block 320). The auth front-end 250A may obtain the entitlements from the auth back-end 250B (block 322), and may return the entitlements and authentication result of success to the server 240 (block 324). If the entitlements are not successfully obtained, the auth front-end 250A may transmit null entitlements and the authentication result of failure to the server 240 (block 324).

Example Authentication Between Device Manager and Receiver

Figure 17:
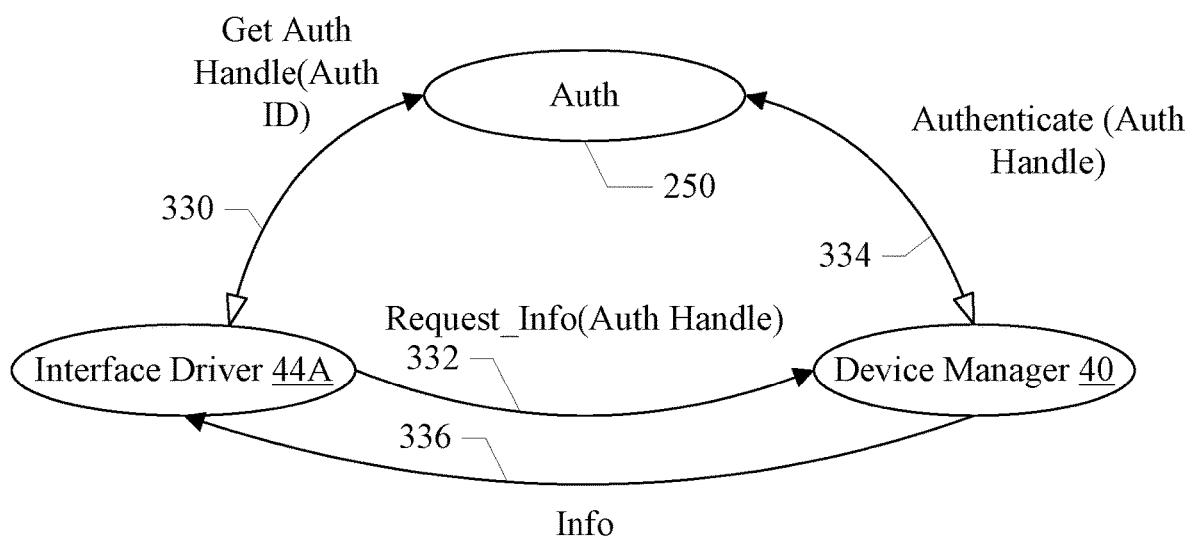
FIG. 17 is a state machine illustrating interaction of the device manager and the interface driver for one embodiment.

The above authentication mechanism may be used to authenticate the drivers 44A-44N with the device manager 40, proving that the drivers 44A-44N have entitlements to the hardware device(s) that they assert they have. For example, in FIG. 17, a portion of the state machine shown in FIG. 11 is shown the interface driver 44A as the client and the device manager 40 as the server. Other drivers 44B-44N may similarly interface as clients with the device manager 40 as server. After launch has started the interface driver 44A, including receiving a handle to auth 250, the interface driver 44A may request its entitlements to the device manager 40/interface hardware 46 from auth 250 (arc 330). Auth 250 may respond with an auth handle, which may be opaque to the interface driver 44A in an embodiment. If the interface driver 44A is not authorized, for example, the handle may be to a null set of entitlements. Otherwise, the entitlements for the interface driver 44A may indicate the access writes that the interface driver 44A has.

The interface driver 44A may transmit a request for information from the device manager 40, including the auth handle and using move once semantics (arc 332). The request may be a request for the resources for the hardware controlled by the device driver 44A (e.g., the interface hardware 46, in this example). The device manager 40 may transmit an authenticate command to auth 250 using the auth handle received from the device manager 40 (arc 334). Based on the returned entitlements from auth 250, the device manager 40 may respond with the request info (arc 336).

It is noted that, in some embodiments, the system may also support name discovery before clients and servers may communicate. The name service may be started by the launcher/loader 254, and other processes started by the launcher/loader 254 may receive handles to the name service. Thus, for example, the interface driver 44A may discover the name of the device manager 40 by transmitting a request to the name service and receiving a handle to the device manager 40. There may be entitlements to the name service as well, which may restrict which services a given process has the ability to discover (and thus which services the given process is able to access).

Numerous variations and modifications will become apparent to those skilled in the art once the above disclosure is fully appreciated. It is intended that the following claims be interpreted to embrace all such variations and modifications.

What is claimed is:

1. A non-transitory computer accessible storage medium storing a plurality of instructions forming a device manager that has access to a device database, wherein the device database stores data identifying a plurality of resources in a computer system that are assigned to a given device of a plurality of devices in the computer system, and wherein the device database further comprises data identifying dependencies between a plurality of device drivers in the computer system, wherein the plurality of instructions is computer-executable to:
  receive a request from a first device driver of the plurality of device drivers to communicate with at least the device manager to obtain the plurality of resources from the device database, the request received by the device manager during initialization of a system including the plurality of devices;
  determine, by the device manager, whether dependencies identified for the first device driver with respect to one or more other device drivers of the plurality of device drivers have cleared, wherein the dependencies are determined to have cleared based on the one or more other device drivers reporting, to the device manager, that the one or more other device drivers are ready to operate; and
  delay a response to the first device driver from the device manager until dependencies identified for the first device driver with respect to one or more other device drivers of the plurality of device drivers have cleared.

2. The non-transitory computer accessible storage medium as recited in claim 1 wherein the plurality of instructions is further computer-executable to:
  receive a second request from the first device driver for a resource allocated to a device in the computer system, the request received by the device manager subsequent to the request from the first device driver to communicate with the device manager;
  access the device database by the device manager to locate the resource; and
  respond to the request by the device manager with a value useable by the first device driver to access the resource.

3. The non-transitory computer accessible storage medium as recited in claim 2 wherein the value is a resource value that directly identifies the resource.

4. The non-transitory computer accessible storage medium as recited in claim 2 wherein the value is a handle to the resource, and wherein the first device driver is configured to transmit the handle to a controller for the resource, and wherein the controller is configured to transmit the handle to the device manager to obtain a resource value.

5. The non-transitory computer accessible storage medium as recited in claim 2 wherein the resource comprises a first address space within a memory address space, and wherein the first address space is memory-mapped to the device, and wherein a read having an address in the first address space is routed to the device instead of to a memory to which a remainder of the memory address space is mapped.

6. The non-transitory computer accessible storage medium as recited in claim 2 wherein the resource comprises an interrupt assigned to the device, and wherein the device is configured to assert the interrupt to an interrupt controller.

7. The non-transitory computer accessible storage medium as recited in claim 1 wherein the request to communicate with the device manager comprises a request for one or more channel identifiers of channels to communicate with at least the device manager.

8. A non-transitory computer accessible storage medium storing a plurality of instructions that are computer-executable to:
  receive a request from a device driver for a resource allocated to a device in a computer system, the request received by a device manager that has access to a device database;
  access the device database by the device manager to locate the resource; and
  respond to the request by the device manager with a handle to the resource, wherein the handle is opaque to the device driver and thereby prevents the device driver from accessing the resource directly, wherein the device driver is configured to transmit the handle to a controller for the resource, and wherein the controller is configured to transmit the handle to the device manager to obtain a resource value, restricting the device driver to the provided resource and preventing the device driver from allocating the resource to the device.

9. The non-transitory computer accessible storage medium as recited in claim 8 wherein the resource comprises an address space in a memory, wherein at least a portion of the address space is memory-mapped to the device.

10. The non-transitory computer accessible storage medium as recited in claim 8 wherein the resource comprises an interrupt assigned to the device.

11. The non-transitory computer accessible storage medium as recited in claim 8 wherein the device database further includes dependency data identifying dependencies between a plurality of device drivers, and wherein the device manager further includes instructions which, when executed:
  receive a request from the device driver for one or more channel identifiers of channels to communicate with at least the device manager; and
  delay a response to the device driver with the one or more channel identifiers until dependencies identified for the device driver with respect to one or more of the plurality of device drivers have cleared.

12. The non-transitory computer accessible storage medium as recited in claim 11 wherein the request from the device driver for the one or more channel identifiers is received prior to the request for the resource.

13. The non-transitory computer accessible storage medium as recited in claim 8 wherein only the device manager has access to the device database.

14. The non-transitory computer accessible storage medium as recited in claim 8 wherein the device database is an only storage location for resource values for a plurality of devices in the computer system.

15. The non-transitory computer accessible storage medium as recited in claim 8 wherein the request includes an indication that the device driver has an entitlement to access the resource.

16. The non-transitory computer accessible storage medium as recited in claim 15 wherein the device manager includes instructions which, when executed, verify that the device driver has the entitlement.

17. The non-transitory computer accessible storage medium as recited in claim 16 wherein the instructions which, when executed, verify that the device driver has the entitlement comprise instructions which, when executed:
  transmit the indication to an authenticator;
  receive a response from the authenticator including the entitlement; and
  process the entitlement to determine that the device driver is permitted to access the resource.

18. A computer system comprising:
    at least one device;
    a processor;
    a non-transitory computer accessible storage medium coupled to the processor and storing a plurality of instructions forming a device manager that has access to a device database, wherein the device database stores data identifying a plurality of resources in the computer system that are assigned to the device, and wherein the device database further comprises data identifying dependencies between a plurality of device drivers in the computer system, wherein the plurality of instructions, when executed by the processor, implement operations comprising:
        receiving a request from a first device driver of the plurality of device drivers to communicate with at least the device manager to obtain the plurality of resources from the device database, the request received by the device manager during initialization of the computer system;
        determining, by the device manager, whether dependencies identified for the first device driver with respect to one or more other device drivers of the plurality of device drivers have cleared, wherein the dependencies are determined to have cleared based on the one or more other device drivers reporting, to the device manager, that the one or more other device drivers are ready to operate; and
        based on the determining, delaying a response to the first device driver from the device manager until dependencies identified for the first device driver with respect to one or more other device drivers of the plurality of device drivers have cleared.

19. The computer system as recited in claim 18 wherein the operations further comprise:
    receiving a second request from the first device driver for a resource allocated to the at least one device;
    accessing the device database by the device manager to locate the resource; and
    respond to the request by the device manager with a handle to the resource, wherein the handle is opaque to the first device driver and thereby prevents the first device driver from accessing the resource directly, wherein the first device driver is configured to transmit the handle to a controller for the resource, and wherein the controller is configured to transmit the handle to the device manager to obtain a resource value, restricting the first device driver to the provided resource and preventing the first device driver from allocating the resource to the device.

20. The computer system as recited in claim 19 wherein the resource comprises at least one of a first address space within a memory address space or a first interrupt, and wherein the first address space is memory-mapped to the at least one device, and wherein a read having an address in the first address space is routed to the at least one device instead of to a memory to which a remainder of the memory address space is mapped, and wherein the first interrupt is assigned to the at least one device, and wherein the device is configured to assert the first interrupt to an interrupt controller.

* * * * *